United States Patent
Nakano

(10) Patent No.: US 10,236,498 B2
(45) Date of Patent: Mar. 19, 2019

(54) ELECTRODE PLATE MANUFACTURING METHOD AND ELECTRODE PLATE MANUFACTURING APPARATUS

(71) Applicant: TOYOTA JIDOSHA KABUSHIKI KAISHA, Toyota-shi, Aichi-ken (JP)

(72) Inventor: Takahiko Nakano, Seto (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 184 days.

(21) Appl. No.: 15/226,357

(22) Filed: Aug. 2, 2016

(65) Prior Publication Data

US 2017/0040591 A1    Feb. 9, 2017

(30) Foreign Application Priority Data

Aug. 5, 2015  (JP) .................. 2015-154733

(51) Int. Cl.
*H01M 4/04*  (2006.01)
*H01M 4/139*  (2010.01)

(52) U.S. Cl.
CPC ....... *H01M 4/0435* (2013.01); *H01M 4/0404* (2013.01); *H01M 4/139* (2013.01)

(58) Field of Classification Search
CPC ... H01M 4/0435; H01M 4/0404; H01M 4/139
See application file for complete search history.

(56) References Cited

FOREIGN PATENT DOCUMENTS

| JP | 10-137821 A | 5/1998 |
|---|---|---|
| JP | 2000331674 A | 11/2000 |
| JP | 2001043848 A | * 2/2001 |
| JP | 2013017962 A | * 1/2013 |
| JP | 2013215688 A | 10/2013 |
| JP | 2014133194 A | 7/2014 |
| JP | 2014-191880 A | 10/2014 |

\* cited by examiner

*Primary Examiner* — Gregg Cantelmo
(74) *Attorney, Agent, or Firm* — Sughrue Mion, PLLC

(57) ABSTRACT

At a first position, an active material layer material is pressurized by first and second rolls, so as to form an active material layer on the second roll. Further, at a third position on a downstream side relative to the first position but on an upstream side relative to, in a rotation direction of the second roll, a second position where a third roll is opposed to the second roll, a part corresponding to a non-formation region in the active material layer is pressurized between a removal surface of the removal portion and the second roll, thereby transferring the pressurized part to the removal surface from the second roll so as to remove the pressurized part. Further, at the second position, the active material layer is transferred onto a surface of a current collector foil from the second roll.

4 Claims, 9 Drawing Sheets

ELECTRODE PLATE MANUFACTURING METHOD AND ELECTRODE PLATE MANUFACTURING APPARATUS

INCORPORATION BY REFERENCE

The disclosure of Japanese Patent Application No. 2015-154733 filed on Aug. 5, 2015 including the specification, drawings and abstract is incorporated herein by reference in its entirety.

BACKGROUND OF THE INVENTION

1. Field of the Invention

The present invention relates to an electrode plate manufacturing method and an electrode plate manufacturing apparatus. More specifically, the present invention relates to an electrode plate manufacturing method and an electrode plate manufacturing apparatus that manufactures an electrode plate such that a belt-shaped current collector foil is conveyed and an active material layer is formed in a part of the conveyed current collector foil in a width direction.

2. Description of Related Art

A battery such as a lithium-ion secondary battery is formed such that positive and negative electrode plates and an electrolyte are accommodated in a case. The positive and negative electrode plates each have a current collector foil and an active material layer. The active material layer contains at least an active material that contributes to charging and discharging, and a binding material that binds the active material onto the current collector foil so as to form the active material layer. A conventional technique related to a manufacturing method of such an electrode plate is disclosed in Japanese Patent Application Publication No. 2014-191880 (JP 2014-191880 A), for example.

JP 2014-191880 A discloses a technique in which a powder constituent containing an active material and so on is supplied to an opposed position of a pair of press rolls from above, and the powder constituent is pressed at the opposed position of the pair of press rolls so as to form an active material layer. Further, in JP 2014-191880 A, a current collector foil is caused to pass the opposed position of the pair of press rolls in a state where the current collector foil is wound around an outer peripheral surface of one of the press rolls. A method described herein is such that an active material layer is formed on a surface of the current collector foil at the opposed position of the pair of press rolls so as to manufacture an electrode plate.

In the meantime, an electrode plate may have a formation region where an active material layer is formed on a current collector foil, and a non-formation region where the current collector foil is exposed. In a device having a configuration of the above conventional technique, in order to manufacture an electrode plate while a formation region and a non-formation region are provided on a current collector foil in a width direction, a powder constituent should be supplied only to a part to become the formation region on the current collector foil. On this account, it is conceivable that a division plate is provided in a boundary between the formation region and the non-formation region so that the powder constituent is supplied only to a formation-region side, for example.

Further, it is preferable that the boundary between the formation region and the non-formation region in the electrode plate be formed in parallel to a conveying direction of the current collector foil. This is to manufacture the electrode plate with a high quality. Further, in order to form the boundary between the formation region and the non-formation region in parallel to the conveying direction of the current collector foil, the division plate should make contact with the current collector foil and the press roll. The reason is as follows: in a case where a gap is formed between the current collector foil or the press roll and the division plate, a powder constituent supplied to a part to become the formation region comes inside a part to become the non-formation region through the gap.

However, in a case where the division plate is provided so as to make contact with the current collector foil or the press roll, the current collector foil or the press roll may be damaged. In a case where the current collector foil or the press roll is damaged, it is difficult to manufacture an electrode plate with a high quality. That is, in the device having the configuration of the conventional technique, it is difficult to manufacture the electrode plate having the formation region and the non-formation region in the width direction while maintaining the high quality.

SUMMARY OF THE INVENTION

The present invention provides an electrode plate manufacturing method and an electrode plate manufacturing apparatus that can manufacture a high-quality electrode plate having a formation region and a non-formation region in a width direction.

An aspect of the present invention relates to a method for manufacturing an electrode plate having a formation region and a non-formation region on a surface of a current collector foil, the formation region being a region in which an active material layer containing at least an active material and a binding material is formed, the non-formation region being a region in which the current collector foil is exposed, the electrode plate being manufactured such that, while the current collector foil having a belt shape is conveyed, the active material layer is formed in a part, in a width direction, of the conveyed current collector foil. The method uses an electrode plate manufacturing apparatus including: a first roll and a second roll placed in parallel to each other and configured to rotate in directions where moving directions of outer peripheral surfaces of the first roll and the second roll at a first position where the outer peripheral surfaces are opposed to each other are both downward along a vertical direction; a third roll placed in parallel to the second roll so as to be opposed to the second roll at a second position different from the first position, the third roll being configured to rotate in a direction where a moving direction of an outer peripheral surface of the third roll at the second position is the same as the moving direction of the outer peripheral surface of the second roll; a removal portion provided at a third position on a downstream side relative to the first position but on an upstream side relative to the second position in a rotation direction of the second roll, the removal portion being configured such that a removal surface opposed to the second roll is moved in the same direction as the moving direction of the outer peripheral surface of the second roll at the third position; and a supply portion configured to supply an active material layer material toward the first position from above the first position, the active material layer material containing at least the active material and the binding material. The second roll is configured to rotate at a circumferential speed faster than a circumferential speed of the first roll. The third roll is configured to rotate at a circumferential speed faster than the circumferential speed of the second roll. The removal portion is configured to move the removal surface at a moving speed faster than a moving speed of the outer peripheral surface of the second roll at the third position. The removal portion includes a projecting portion provided in a region corresponding to the non-formation region so as to project toward the second roll relative to a region corresponding to the formation region. The method includes: pressurizing the active material layer material supplied from the supply portion by the first roll and the second roll both rotating while the active material layer material passes the first position, thereby forming the active material layer such that the active material layer material thus pressurized is attached onto the second roll; pressurizing, in a thickness direction, a part corresponding to the non-formation region in the active material layer by the projecting portion of the removal portion at a time when the active material layer passes the third position between the removal surface and the second roll, thereby transferring the pressurized part of the active material layer to the removal surface from the second roll so as to remove the pressurized part of the active material layer; and conveying the current collector foil by the rotating third roll so as to pass the second position, thereby pressurizing, in the thickness direction, the current collector foil and the active material layer passing the second position between the second roll and the third roll and transferring the active material layer onto the surface of the current collector foil from the second roll.

In the manufacturing method, the part corresponding to the non-formation region in the active material layer formed on the second roll at the first position can be removed by the removal surface of the removal portion from the second roll at the second position. That is, a part around an end portion in the width direction is removed from the active material layer formed by pressurizing the active material layer material. In the part around the end portion in the width direction, the quality easily becomes nonuniform. Hereby, only a part corresponding to the formation region and having a uniform quality in the active material layer thus formed can be left on the second roll. Further, the active material layer corresponding to the formation region on the second roll is transferred onto a surface of the current collector foil from the second roll at the second position. Thus, it is possible to manufacture a high-quality electrode plate having a formation region and a non-formation region in a width direction.

The removal portion may include a removal roll placed in parallel to the second roll such that an outer peripheral surface of the removal roll is opposed to the second roll at the third position, the removal roll being configured to rotate in a direction where a moving direction of the outer peripheral surface of the removal roll at the third position is the same as the moving direction of the outer peripheral surface of the second roll, and a removal film wound around the removal roll and configured to pass the third position by a rotation of the removal roll, the removal film having the removal surface on a surface on a second-roll side. The removal roll may include the projecting portion formed such that the region corresponding to the non-formation region in an axial direction projects radially relative to the region corresponding to the formation region. Since the removal film does not have a high strength, the removal film may meander at the time of passing the third position. Meanwhile, a high-strength material can be used for the removal roll. Accordingly, even at a time when the removal film meanders, it is possible to stably manufacture a high-quality electrode plate.

A second aspect of the present invention relates to an apparatus for manufacturing an electrode plate having a formation region and a non-formation region on a surface of a current collector foil, the formation region being a region in which an active material layer containing at least an active material and a binding material is formed, the non-formation region being a region in which the current collector foil is exposed. The apparatus includes: a first roll and a second roll placed in parallel to each other and configured to rotate in directions where moving directions of outer peripheral surfaces of the first roll and the second roll at a first position where the outer peripheral surfaces are opposed to each other are both downward along a vertical direction; a third roll placed in parallel to the second roll so as to be opposed to the second roll at a second position different from the first position, the third roll being configured to rotate in a direction where a moving direction of an outer peripheral surface of the third roll at the second position is the same as the moving direction of the outer peripheral surface of the second roll; a removal portion provided at a third position on a downstream side relative to the first position but on an upstream side relative to the second position in a rotation direction of the second roll, the removal portion being configured such that a removal surface opposed to the second roll is moved in the same direction as the moving direction of the outer peripheral surface of the second roll at the third position, the removal portion including a projecting portion provided in a region corresponding to the non-formation region so as to project toward the second roll relative to a region corresponding to the formation region; a supply portion configured to supply an active material layer material toward the first position from above the first position, the active material layer material containing at least the active material and the binding material; and a control unit configured to rotate the second roll at a circumferential speed faster than a circumferential speed of the first roll, to rotate the third roll at a circumferential speed faster than the circumferential speed of the second roll, and to cause the removal portion to move the removal surface at a moving speed faster than a moving speed of the outer peripheral surface of the second roll at the third position.

The removal portion may include: a removal roll placed in parallel to the second roll such that an outer peripheral surface of the removal roll is opposed to the second roll at the third position, the removal roll being configured to rotate in a direction where a moving direction of the outer peripheral surface of the removal roll at the third position is the same as the moving direction of the outer peripheral surface of the second roll, and a removal film wound around the removal roll and configured to pass the third position by a rotation of the removal roll, the removal film having the removal surface on a surface on a second-roll side. The projecting portion may be formed such that the region corresponding to the non-formation region in an axial direction projects radially relative to the region corresponding to the formation region.

According to the present invention, it is possible to provide an electrode plate manufacturing method that can manufacture a high-quality electrode plate having a formation region and a non-formation region in a width direction.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a best mode for embodying the present invention in detail with reference to the drawings.

Figure 1:
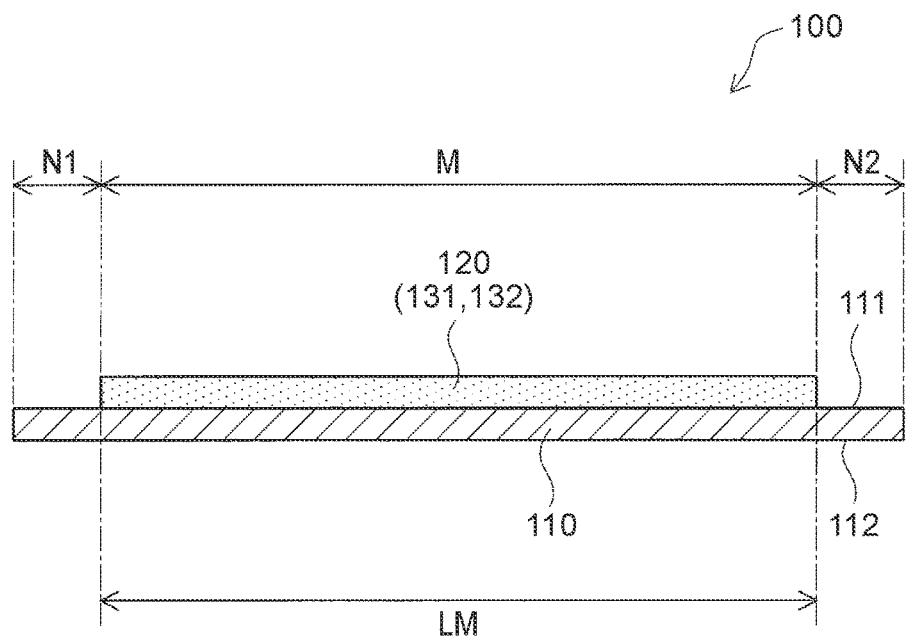
FIG. 1 is a sectional view of an electrode plate according to an embodiment.

First, the following describes an electrode plate 100 to be manufactured in the present embodiment with reference to FIG. 1. As illustrated in a sectional view of FIG. 1, the electrode plate 100 includes a current collector foil 110 and an active material layer 120. The electrode plate 100 is elongated in a depth direction in FIG. 1.

In the electrode plate 100 of the present embodiment, the active material layer 120 is formed only on a first surface 111 of the current collector foil 110. The electrode plate 100 is used as a positive electrode or a negative electrode for constituting a secondary battery such as a lithium-ion secondary battery, for example. When the electrode plate 100 is used as a positive electrode or a negative electrode in manufacture of a secondary battery, the electrode plate 100 is cut in a necessary size as appropriate.

As the current collector foil 110, a metal foil can be used, for example. Further, the active material layer 120 contains at least an active material 131 and a binding material 132. The active material 131 contributes to charging and discharging in a battery. Further, the binding material 132 binds materials constituting the active material layer 120 to each other so as to form the active material layer 120 and also binds the active material layer 120 to the first surface 111 of the current collector foil 110.

More specifically, in a case where the electrode plate 100 is a positive electrode of a lithium-ion secondary battery, an aluminum foil can be used as the current collector foil 110, $LiNi_{0.5}Mn_{1.5}O_4$ can be used as the active material 131, and polyvinylidene fluoride (PVDF) can be used as the binding material 132, for example. In a case where the electrode plate 100 is a negative electrode of a lithium-ion secondary battery, a copper foil can be use as the current collector foil 110, a carbon material can be used as the active material 131, and carboxymethyl cellulose (CMC) can be used as the binding material 132, for example. Note that the active material layer 120 may further contain a material except for the active material 131 and the binding material 132, e.g., a conductive material for raising conductivity in the active material layer 120, or the like as appropriate.

Further, as illustrated in FIG. 1, the electrode plate 100 of the present embodiment has: a formation region M where the active material layer 120 is formed on the first surface 111 of the current collector foil 110; and non-formation regions N1, N2 where the active material layer 120 is not formed and the first surface 111 of the current collector foil 110 is exposed. The non-formation regions N1, N2 are provided at both ends of the electrode plate 100 in the width direction, which is a right-left direction in FIG. 1. The formation region M is provided in a center in the width direction, sandwiched between the non-formation regions N1, N2 at both ends. That is, the formation region M and the non-formation regions N1, N2 extend in a longitudinal direction of the electrode plate 100. Note that a length of the formation region M in the width direction is indicated by a length LM in FIG. 1.

Figure 2:
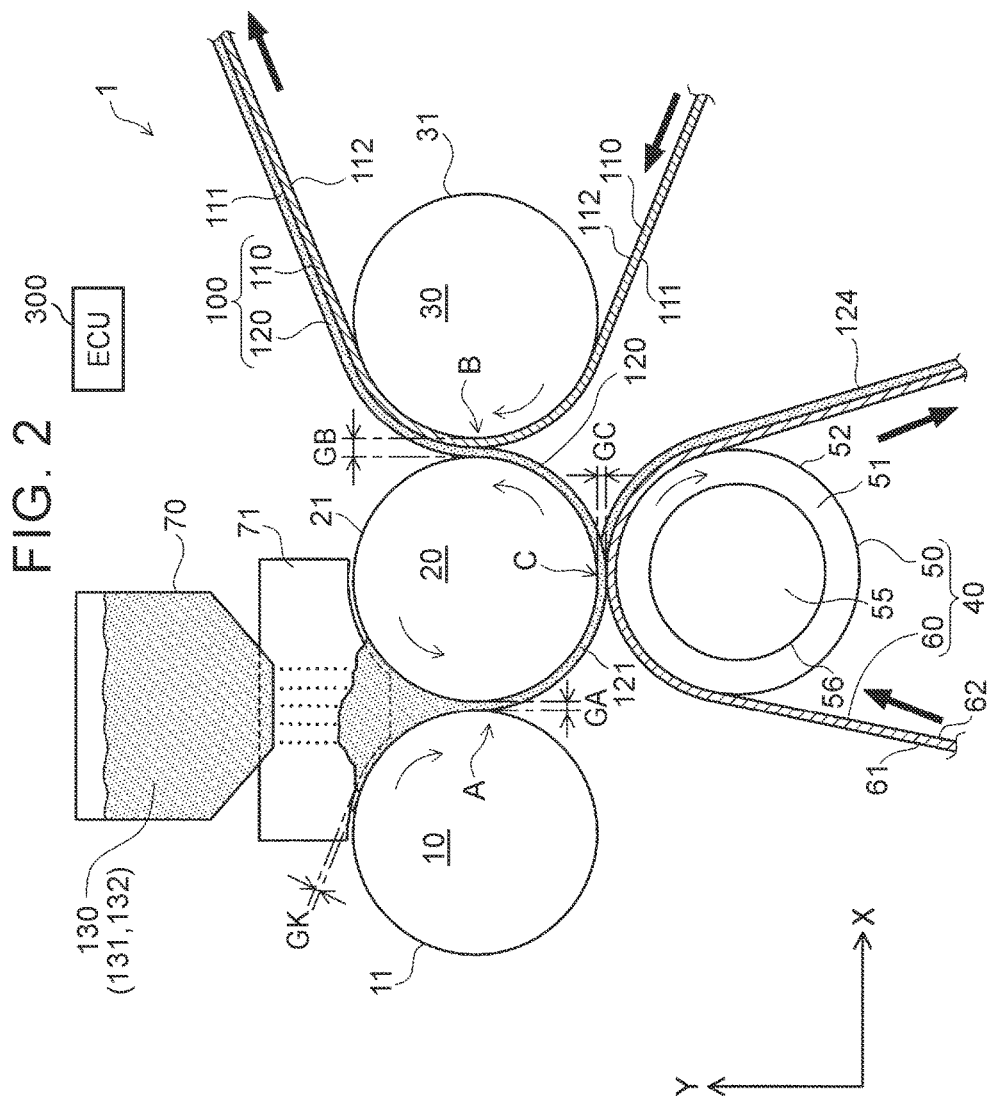
FIG. 2 is a schematic configuration diagram of an electrode plate manufacturing apparatus according to the embodiment.

Next will be described an electrode plate manufacturing apparatus to be used in manufacture of the electrode plate 100 of the present embodiment. FIG. 2 is a schematic configuration diagram of an electrode plate manufacturing apparatus 1 of the present embodiment. In FIG. 2, an X-axis along the right-left direction and a Y-axis along an up-down direction are shown. Note that a depth direction in FIG. 2 is assumed a Z-axis. As illustrated in FIG. 2, the electrode plate manufacturing apparatus 1 includes a first roll 10, a second roll 20, a third roll 30, a removal portion 40, and a powder supply portion 70. In FIG. 2, the up-down direction is a vertical direction, and the gravity works downward.

As illustrated in FIG. 2, the first roll 10, the second roll 20, and the third roll 30 are all placed in a state where an axial direction thereof is along a horizontal direction. The first roll 10, the second roll 20, and the third roll 30 are made of a material having a high strength such as metal, for example. Further, the first roll 10 and the second roll 20 are placed in parallel to each other in a state where their outer peripheral surfaces 11, 21 are opposed to each other at a first opposed position A. Further, the third roll 30 is placed in parallel to the second roll 20 in a state where their outer peripheral surfaces 21, 31 are opposed to each other at a second opposed position B.

Further, the first roll 10 and the second roll 20 are held so that a shaft distance therebetween is a given interval. A gap GA is provided between the outer peripheral surface 11 of the first roll 10 and the outer peripheral surface 21 of the second roll 20 at the first opposed position A. Further, the third roll 30 is held so that a shaft distance between the third roll 30 and the second roll 20 is a given interval. A gap GB is provided between the outer peripheral surface 21 of the second roll 20 and the outer peripheral surface 31 of the third roll 30 at the second opposed position B.

Further, the first roll 10, the second roll 20, the third roll 30 are configured to rotate when the electrode plate 100 is manufactured. In FIG. 2, respective rotation directions of the first roll 10, the second roll 20, and the third roll 30 are indicated by respective arrows. As illustrated in FIG. 2, the rotation directions of the first roll 10 and the third roll 30 are clockwise, and the rotation direction of the second roll 20 is counterclockwise.

That is, the rotation directions of the first roll 10 and the second roll 20 are directions in which moving directions of the outer peripheral surfaces 11, 21 at the first opposed position A are both downward along the vertical direction. Further, the second roll 20 rotates at a circumferential speed faster than a circumferential speed of the first roll 10. Further, the rotation direction of the third roll 30 is a direction in which a moving direction of the outer peripheral surface 31 at the second opposed position B is the same as a moving direction of the outer peripheral surface 21 of the second roll 20. Further, the third roll 30 rotates at a circumferential speed faster than the circumferential speed of the second roll 20.

The powder supply portion 70 is provided above the first opposed position A where the first roll 10 and the second roll 20 are opposed to each other. The powder supply portion 70 can supply a powder constituent 130 accommodated thereinside by dropping the powder constituent 130. That is, the powder supply portion 70 can supply the powder constituent 130 toward the first opposed position A from above the first opposed position A. As illustrated in FIG. 2, the powder constituent 130 supplied from the powder supply portion 70 is accumulated between the first roll 10 and the second roll 20 on an upper side at the first opposed position A.

The powder constituent 130 is an active material layer material containing powdery materials for forming the active material layer 120. The powder constituent 130 of the present embodiment contains the active material 131 and the binding material 132. Further, particles in the powder constituent 130 of the present embodiment are granulated particles obtained by granulating the active material 131 and the binding material 132. Note that, in a case where the active material layer 120 is formed so as to contain a material such as a conductive material as well as the active material 131 and the binding material 132, powder of the material is mixed into the powder constituent 130.

Figure 3:
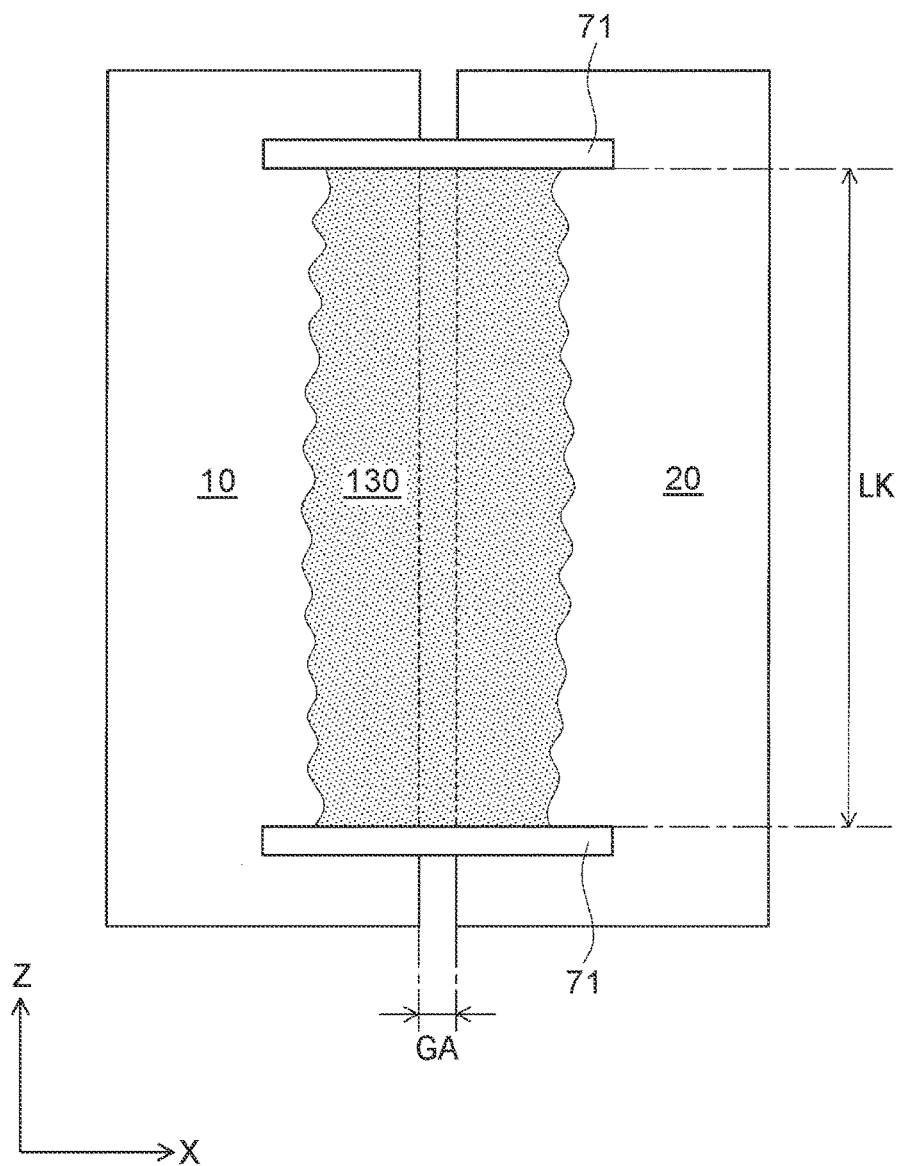
FIG. 3 is a plan view of the electrode plate manufacturing apparatus according to the embodiment, at a first opposed position.

Further, a division plate 71 is provided between the first roll 10 and the second roll 20 above the first opposed position A. FIG. 3 is a plan view at the first opposed position A. In FIG. 3, the X-axis direction is the right-left direction and the Z-axis direction is the up-down direction. As illustrated in FIG. 3, a pair of division plates 71 is provided. The division plates 71 are provided an interval having a length LK therebetween.

The powder constituent 130 is supplied to between the pair of division plates 71 by the powder supply portion 70, so as to be accumulated between the pair of division plates 71 as illustrated in FIG. 3. The division plates 71 can restrict positions of the powder constituent 130 in the axial direction of the first roll 10 and the second roll 20. The powder constituent 130 is accumulated between the first roll 10 and the second roll 20 above the first opposed position A. Note that, in the present embodiment, the length LK of the interval between the pair of division plates 71 is at least a length LM, in the width direction, of the formation region M in the electrode plate 100.

Further, in the present embodiment, as illustrated in FIG. 2, the division plates 71 are placed with a gap GK with respect to the outer peripheral surface 11 of the first roll 10 and the outer peripheral surface 21 of the second roll 20. That is, the division plates 71 do not make contact with the first roll 10 and the second roll 20. Accordingly, in the electrode plate manufacturing apparatus 1, the division plates 71 do not make contact with the first roll 10 and the second roll 20, thereby restraining the outer peripheral surfaces 11, 21 from being damaged.

The removal portion 40 is provided at a removal position C placed on a downstream side relative to the first opposed position A but on an upstream side relative to the second opposed position B in the rotation direction of the second roll 20. Further, the removal portion 40 of the present embodiment is constituted by a removal roll 50 and a removal film 60. The removal roll 50 is also placed in a state where its axial direction is along the horizontal direction.

The removal roll 50 is made of a material having a high strength such as metal, for example.

Figure 4:
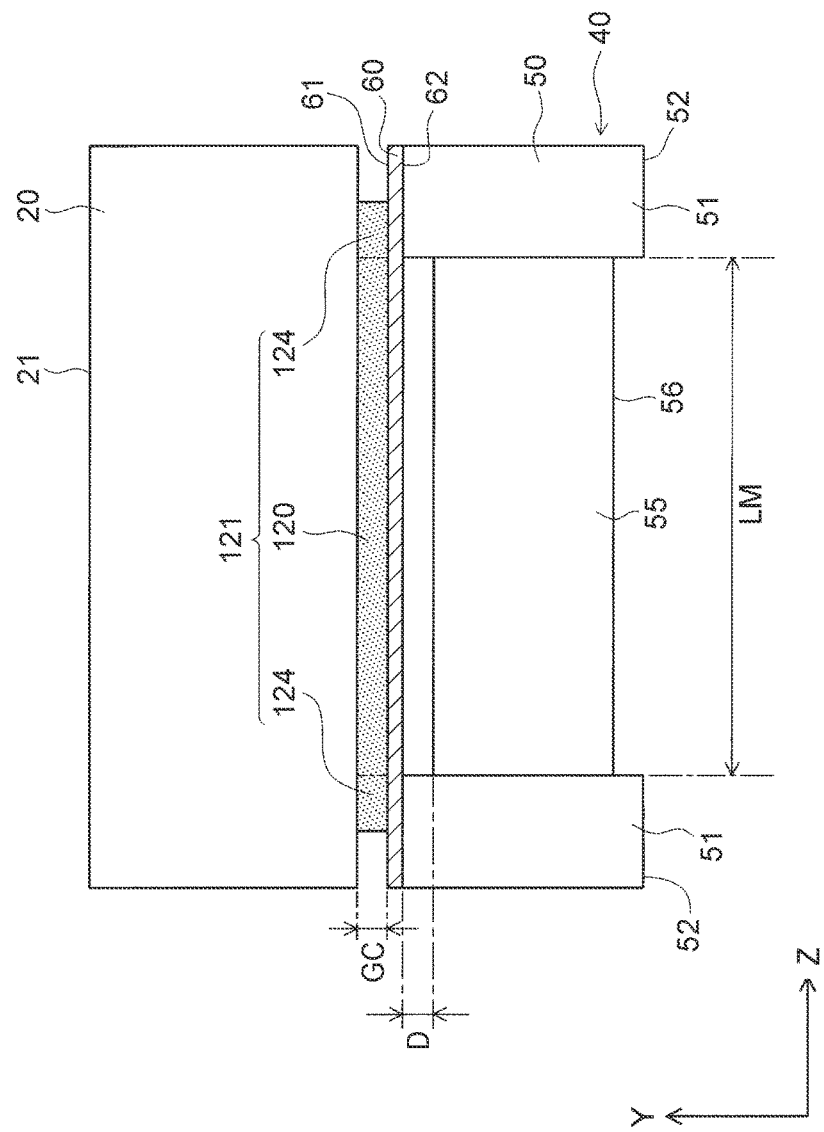
FIG. 4 is a sectional view of the electrode plate manufacturing apparatus according to the embodiment, at a removal position.

FIG. 4 is a sectional view at the removal position C. In FIG. 4, the Z-axis direction is the right-left direction and the Y-axis direction is the up-down direction. As illustrated in FIG. 4, the removal roll 50 includes large-diameter portions 51 placed at both axial ends, and a small-diameter portion 55 placed in a center in the axial direction so as to be sandwiched between the large-diameter portions 51 at both ends. The large-diameter portions 51 have a diameter larger than that of the small-diameter portion 55, and project in a radial direction. In view of this, the large-diameter portions 51 are parts projecting toward the second roll 20 relative to the small-diameter portion 55. That is, the large-diameter portion 51 can be regarded as a "projecting portion". In FIG. 4, a difference D between a radius of the large-diameter portion 51 and a radius of the small-diameter portion 55 is shown.

Further, an interval with a length LM is provided between the large-diameter portions 51 at both ends of the removal roll 50. Accordingly, the large-diameter portions 51 are provided in regions corresponding to the non-formation regions N1, N2 of the electrode plate 100. Further, the small-diameter portion 55 is provided in a region corresponding to the formation region M of the electrode plate 100.

Further, the removal roll 50 is placed in parallel to the second roll 20 in a state where outer peripheral surfaces 52 of the large-diameter portions 51 are opposed to the outer peripheral surface 21 of the second roll 20 at the removal position C. At the time of manufacturing the electrode plate 100, the removal roll 50 rotates clockwise as indicated by an arrow in FIG. 2. That is, a rotation direction of the removal roll 50 is a direction in which a moving direction of the outer peripheral surfaces 52 at the removal position C is the same as the moving direction of the outer peripheral surface 21 of the second roll 20.

The removal film 60 is an elongated belt-shaped member. As the removal film 60, a film having a thickness of 5 μm to 100 μm can be used. In the present embodiment, as the removal film 60, a film made of polyethylene terephthalate (PET) and having a thickness of 50 μm is used. Note that, as the removal film 60, a resin film other than PET, e.g., films made of polypropylene (PP), polystyrene (PS), polyvinylchloride (PVC), polyimide (PI), and the like can be used.

As illustrated in FIG. 2, the removal film 60 is wound around the removal roll 50 at the removal position C. Because of this, at the time of the manufacture of the electrode plate 100, the removal film 60 is conveyed by the rotating removal roll 50. That is, as illustrated in FIG. 2, the removal film 60 is conveyed to move from a bottom left of the removal roll 50 toward the removal position C, and then move toward a bottom right of the removal roll 50 after the removal film 60 passes the removal position C.

Further, when the removal film 60 is conveyed, the removal film 60 passes the removal position C in a state where a first surface 61 faces a second-roll-20 side and a second surface 62 faces a removal-roll-50 side. On this account, the first surface 61 of the removal film 60 is a surface opposed to the second roll 20. Further, the removal roll 50 is held so that a shaft distance between the removal roll 50 and the second roll 20 is a given interval. A gap GC is provided between the first surface 61 of the removal film 60 and the outer peripheral surface 21 of the second roll 20 at the removal position C.

As described above, the second roll 20 and the removal roll 50 rotate in directions where moving directions of the outer peripheral surfaces 21, 52 at the removal position C are the same. On this account, the first surface 61 of the removal film 60 at the removal position C moves in the same direction as the moving direction of the outer peripheral surface 21 of the second roll 20 at the removal position C. Further, the removal roll 50 of the present embodiment rotates such that a circumferential speed of the large-diameter portions 51 is faster than the circumferential speed of the second roll 20. On this account, a moving speed of the first surface 61 of the removal film 60 at the removal position C is faster than the circumferential speed of the second roll 20.

As illustrated in FIG. 4, the first surface 61 and the second surface 62 of the removal film 60 are both flat. As illustrated in FIG. 4, the second surface 62 of the removal film 60 is wound around the outer peripheral surface 52 of the large-diameter portion 51 of the removal roll 50. That is, the second surface 62 of the removal film 60 does not make contact with an outer peripheral surface 56 of the small-diameter portion 55. This is because there is a difference D in radius between the large-diameter portions 51 and the small-diameter portion 55.

Further, a current collector foil 110 is wound around the outer peripheral surface 31 of the third roll 30 as illustrated in FIG. 2. The current collector foil 110 is wound around the third roll 30 in a state where a width direction of the current collector foil 110 is set along the axial direction of the third roll 30. Further, in a state where a second-surface-112 side faces the outer peripheral surface 31 of the third roll 30, the current collector foil 110 is wound at the second opposed position B of the third roll 30. Hereby, the current collector foil 110 is conveyed by a rotation of the third roll 30.

Further, a first surface 111 of the current collector foil 110 is opposed to the outer peripheral surface 21 of the second roll 20 at the second opposed position B. Note that, as described above, the third roll 30 rotates at the circumferential speed faster than that of the second roll 20. Therefore, a moving speed of the first surface 111 of the current collector foil 110 at the second opposed position B is faster than a moving speed of the outer peripheral surface 21 of the second roll 20 at the second opposed position B.

Further, as illustrated in FIG. 2, the current collector foil 110 is supplied into the electrode plate manufacturing apparatus 1 from a bottom right of the third roll 30, and after the current collector foil 110 passes the second opposed position B, the current collector foil 110 is conveyed so as to be discharged toward an upper right of the third roll 30. When the current collector foil 110 is supplied to the electrode plate manufacturing apparatus 1, nothing is formed on the first surface 111. The electrode plate manufacturing apparatus 1 can manufacture the electrode plate 100 such that the active material layer 120 is formed on the first surface 111 of the current collector foil 110 at the second opposed position B. Note that the rotation speeds of the first roll 10, the second roll 20, the third roll 30, and the removal roll 50, a conveyance speed of the removal film 60, and a supply speed of the powder constituent 130 from the powder supply portion 70 to the first opposed position A are controlled by an ECU 300.

Next will be described a manufacturing method of the electrode plate 100 of the present embodiment by use of the electrode plate manufacturing apparatus 1. At the time of the manufacture of the electrode plate 100, the powder constituent 130 is supplied to between the pair of division plates 71 by the powder supply portion 70. The powder constituent 130 thus supplied and accumulated between the pair of division plates 71 is sent to the first opposed position A sequentially from particles on a lower side by rotations of the first roll 10 and the second roll 20.

The powder constituent 130 that has reached the first opposed position A passes the gap GA by the rotations of the first roll 10 and the second roll 20. At the time when the powder constituent 130 passes the gap GA, the powder constituent 130 is pressurized between the outer peripheral surface 11 of the first roll 10 and the outer peripheral surface 21 of the second roll 20. Due to the pressurization, the particles in the powder constituent 130 are bound together due to an operation of the binding material 132 in the powder constituent 130. Hereby, the powder constituent 130 that has passed the first opposed position A is shaped into the sheet-shaped active material layer 121.

The active material layer 121 formed at the first opposed position A is attached to a surface that moves at a faster moving speed at the first opposed position A, out of the outer peripheral surface 11 of the first roll 10 and the outer peripheral surface 21 of the second roll 20. As described above, the circumferential speed of the second roll 20 is faster than that of the first roll 10. That is, the active material layer 121 formed at the first opposed position A is attached to the second roll 20. Accordingly, as illustrated in FIG. 2, the active material layer 121 formed at the first opposed position A is attached onto the outer peripheral surface 21 of the second roll 20 that has passed the first opposed position A.

Figure 5:
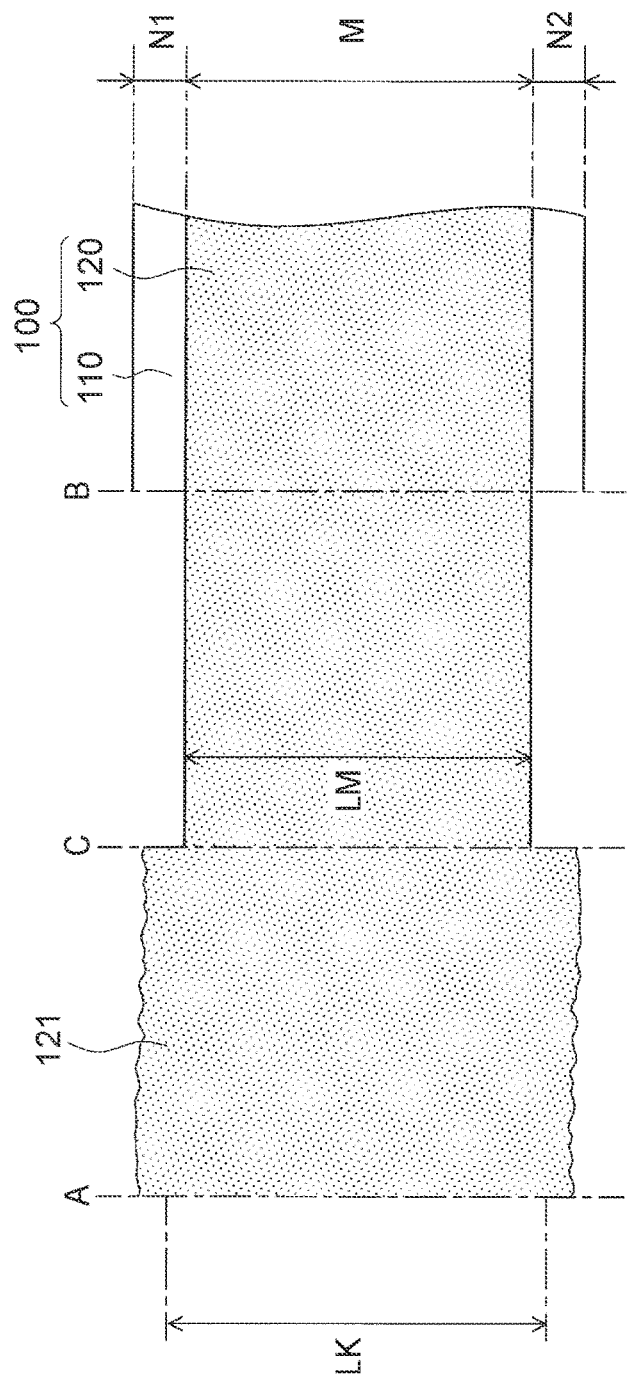
FIG. 5 is a plan view of an active material layer from the first opposed position to a position where an electrode plate is manufactured.

Further, the active material layer 121 formed at the first opposed position A is then conveyed by the rotation of the second roll 20, as illustrated in FIG. 2, and passes the removal position C and the second opposed position B in this order. Hereby, the electrode plate 100 is manufactured at the second opposed position B. FIG. 5 is a plan view of an active material layer after the active material layer is formed at the first opposed position A until the electrode plate 100 is manufactured. In FIG. 5, the first opposed position A, the removal position C, and the second opposed position B are shown. That is, a direction where the active material layer is conveyed is a right side. Further, the up-down direction in FIG. 5 is a width direction of the active material layer.

A length, in the width direction, of the active material layer 121 which is formed at the first opposed position A but which has not reached the removal position C is longer than the length LK of the interval between the pair of division plates 71, as illustrated in FIG. 5. Further, the length, in the width direction, of the active material layer 121 formed at the first opposed position A is not uniform. That is, both ends, in the width direction, of the active material layer 121 formed at the first opposed position A are not parallel to the conveying direction but distorted in a waveform.

Figure 6:
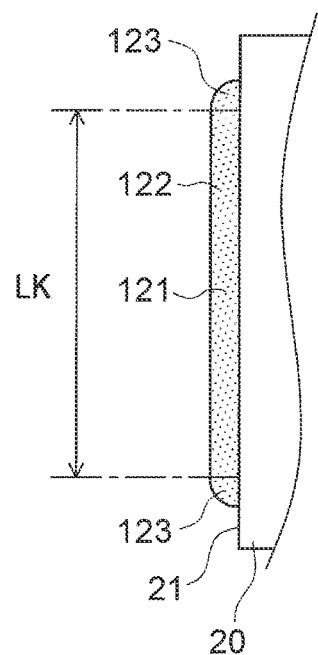
FIG. 6 is a sectional view of the active material layer between the first opposed position and the removal position.

Further, FIG. 6 is a sectional view of the active material layer 121 formed at the first opposed position A. As illustrated in FIG. 6, in the active material layer 121, its thickness is uniform in a central part 122 corresponding to a part (indicated by the length LK) between the pair of division plates 71. In the meantime, thicknesses at end portions 123, which are both ends outside the central part 122 in the width direction, are thinner than the central part 122. Further, as the end portion 123 is farther from the central part 122 and closer to an end, the end portion 123 becomes thinner. That is, in the active material layer 121 which is formed at the first opposed position A but which has not reached the removal position C, the quality of parts near both ends in the width direction is not uniform both in terms of the width direction and the conveying direction.

As described above, the gap GK is provided between the division plate 71 and each of the outer peripheral surface 11 of the first roll 10 and the outer peripheral surface 21 of the second roll 20. Further, the gap GA between the first roll 10 and the second roll 20 is small at the first opposed position A. Because of this, as illustrated in FIG. 2, the division plate 71 is not inserted up to the first opposed position A, so the division plate 71 cannot restrict the powder constituent 130 at the first opposed position A. The end portions 123 of the active material layer 121 formed at the first opposed position A are parts formed of the powder constituent 130 that passes the gap GK and the like and protrudes outside the pair of division plates 71 before the powder constituent 130 passes the first opposed position A. That is, the active material layer 121 formed by pressurizing the powder constituent 130 easily becomes nonuniform in quality around the end portions in the width direction.

Subsequently, the active material layer 121 on the outer peripheral surface 21 of the second roll 20 is conveyed by the rotation of the second roll 20 as illustrated in FIG. 2, and reaches the removal position C at which the removal portion 40 is provided. The active material layer 121 that has reached the removal position C passes the gap GC, and at a time when the active material layer 121 passes the gap GC, the active material layer 121 is pressurized in its thickness direction between the outer peripheral surface 21 of the second roll 20 and the first surface 61 of the removal film 60.

Here, as described above, the second surface 62 of the removal film 60 makes contact with the outer peripheral surfaces 52 of the large-diameter portions 51 of the removal roll 50, but does not make contact with the outer peripheral surface 56 of the small-diameter portion 55. On this account, as illustrated in FIG. 4, only end portions 124 of the active material layer 121 are pressurized. The end portions 124 are placed at both ends of the active material layer 121 in the width direction and opposed to the large-diameter portions 51 of the removal roll 50. As described above, the moving speed of the first surface 61 of the removal film 60 at the removal position C is faster than the circumferential speed of the second roll 20.

At the removal position C, the pressurized end portions 124 of the active material layer 121 are attached to a surface that moves at a faster moving speed at the removal position C, out of the outer peripheral surface 21 of the second roll 20 and the first surface 61 of the removal film 60. Accordingly, at the removal position C, the end portions 124 of the active material layer 121 are transferred onto the first surface 61 of the removal film 60 from the outer peripheral surface 21 of the second roll 20. Thus, as illustrated in FIG. 2, only the end portions 124 of the active material layer 121 are attached onto the first surface 61 of the removal film 60 that has passed the removal position C. Hereby, the end portions 124 of the active material layer 121 are removed from the outer peripheral surface 21 of the second roll 20. Further, the end portions 124 of the active material layer 121 thus removed at the removal position C are regions corresponding to the non-formation regions N1, N2 of the electrode plate 100. This is because the large-diameter portions 51 are provided in regions corresponding to the non-formation regions N1, N2 of the electrode plate 100, as described above.

Meanwhile, an active material layer 120 is left on the outer peripheral surface of the second roll 20 that has passed the removal position C so that the end portions 124 have been removed therefrom, as illustrated in FIG. 2. The active material layer 120 is a central part of the active material layer 121, and the central part has not been pressurized at the removal position C, as illustrated in FIG. 4. Further, the active material layer 120 is a part opposed to the small-diameter portion 55 of the removal roll 50 at the removal position C, and a length thereof in the width direction is the length LM of the interval between the large-diameter portions 51 at both ends of the removal roll 50. That is, the active material layer 120 is attached to a region of the outer peripheral surface 21 of the second roll 20, the region corresponding to the formation region M of the electrode plate 100.

Figure 7:
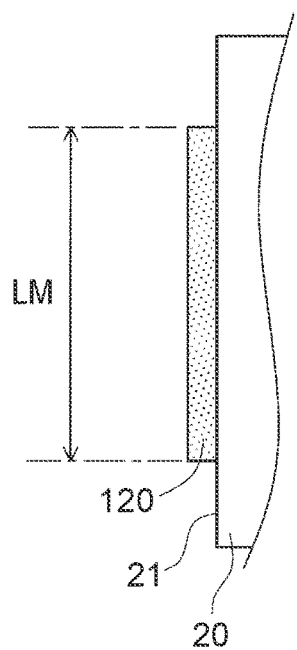
FIG. 7 is a sectional view of the active material layer between the removal position and a second opposed position.

As illustrated in a plan view of FIG. 5, a length, in the width direction, of the active material layer 120 that has passed the removal position C is maintained uniform at the length LM. Because of this, the active material layer 120 that has passed the removal position C is formed such that both ends thereof in the width direction are parallel to the conveying direction. Further, FIG. 7 is a sectional view of the active material layer 120 that has passed the removal position C. As illustrated in FIG. 7, a thickness of the active material layer 120 in the width direction is uniform. That is, the active material layer 120 that has passed the removal position C has a uniform quality both in terms of the width direction and the conveying direction.

As described above, the length, in the width direction, of the active material layer 121 that has not reached the removal position C is longer than the length LK of the interval between the pair of division plates 71. Further, the length LK of the interval between the pair of division plates 71 is at least the length LM, in the width direction, of the formation region M in the electrode plate 100. That is, the active material layer 120 that has passed the removal position C is obtained such that the end portions 124 including the end portions 123 that are nonuniform in quality are removed from the active material layer 121 that is nonuniform in quality around both ends. Further, the active material layer 120 that has passed the removal position C is the central part 122 of the active material layer 121. The quality of the central part 122 is uniform because its thickness is uniform.

Subsequently, the active material layer 120 on the outer peripheral surface 21 of the second roll 20 that has passed the removal position C is conveyed by the rotation of the second roll 20 as illustrated in FIG. 2, and reaches the second opposed position B. The current collector foil 110 is conveyed to pass the second opposed position B as illustrated in FIG. 2. On this account, the active material layer 120 that has reached the second opposed position B by the rotation of the second roll 20 passes the gap GB together with the current collector foil 110. At the time of passing the gap GB, the current collector foil 110 and the active material layer 120 are pressurized by the second roll 20 and the third roll 30 in their thickness direction. Further, as described above, the third roll 30 of the present embodiment rotates at a circumferential speed at which a moving speed of the first surface 111 of the current collector foil 110 at the second opposed position B is faster than the circumferential speed of the second roll 20.

Also at the second opposed position B, the active material layer 120 thus pressurized is attached to a surface that moves at a faster moving speed at the second opposed position B, out of the outer peripheral surface 21 of the second roll 20 and the first surface 111 of the current collector foil 110. Hereby, at the second opposed position B, the active material layer 120 is transferred onto the first surface 111 of the current collector foil 110 from the outer peripheral surface 21 of the second roll 20. Therefore, as illustrated in FIG. 2, the active material layer 120 is transferred to the first surface 111 of the current collector foil 110 that has passed the second opposed position B. Thus, the electrode plate 100 is manufactured.

Further, as illustrated in FIG. 5, the formation region M and the non-formation regions N1, N2 are provided in the electrode plate 100 that has passed the second opposed position B. The active material layer 120 formed in the formation region M has a uniform quality both in terms of the width direction and the conveying direction. Accordingly, in the present embodiment, the high-quality electrode plate 100 having the formation region M and the non-formation regions N1, N2 in the width direction is manufactured by using the electrode plate manufacturing apparatus 1.

Note that, in the electrode plate manufacturing apparatus 1 of the present embodiment, a circumferential speed ratio A, represented by a ratio of the circumferential speed of the second roll 20 with respect to the circumferential speed of the first roll 10, is preferably 4/3 or more. When the circumferential speed ratio A is 4/3 or more, the active material layer 121 formed by the powder constituent 130 passing the first opposed position A can be successfully attached to the outer peripheral surface 21 of the second roll 20.

Further, the inventor performed an experiment in which electrode plates 100 were manufactured by use of the electrode plate manufacturing apparatus 1 using different circumferential speed ratios between opposed rolls at the first opposed position A, the second opposed position B, and the removal position C. In this experiment, a copper foil of 8 μm was used as the current collector foil 110. Further, as the powder constituent 130 to be supplied from the powder supply portion 70, granulated particles obtained by granulating graphite as the active material 131 and carboxymethyl cellulose (CMC) as the binding material 132 were used. Then, the first roll 10, the second roll 20, the third roll 30, and the removal roll 50 were rotated at respective circumferential speeds shown in Table 1, so as to manufacture the electrode plates 100.

In Table 1, the circumferential speed ratio A, which is a ratio of the circumferential speed of the second roll 20 with respect to the circumferential speed of the first roll 10, is shown. Further, a circumferential speed ratio B shown in Table 1 is a ratio of the circumferential speed of the third roll 30 with respect to the circumferential speed of the second roll 20. A circumferential speed ratio C is a ratio of the circumferential speed of the removal roll 50 with respect to the circumferential speed of the second roll 20. As shown in Table 1, the circumferential speed ratio B and the circumferential speed ratio C take smaller values from Example 1 to Example 6.

In the experiment, an electrode plate 100 having a formation region M and non-formation regions N1, N2 was able to be manufactured in each example. This is because, as shown in Table 1, the second roll 20 rotates at a circumferential speed faster than the circumferential speed of the first roll 10 in each example. This is also because both the third roll 30 and the removal roll 50 rotate at a circumferential speed faster than the circumferential speed of the second roll 20 in each example.

Note that, in each example, the circumferential speed ratio A is 5/3, which is 4/3 or more. As a result, in each example, an active material layer 121 was able to be formed successfully on the second roll 20 at the first opposed position A.

Further, Table 1 shows evaluations of the electrode plates 100 manufactured in respective examples. As shown in Table 1, Example 1 and Example 6 are evaluated as a "Δ." This is because, in each of the electrode plates 100 of Example 1 and Example 6, a first surface 111 of a current collector foil 110 in non-formation regions N1, N2 was not completely exposed. That is, in each of Example 1 and Example 6, end portions 124 of an active material layer 121 were not completely removed by the removal portion 40, and the end portions 124 of the active material layer 121, slightly left on the second roll 20, were transferred to the first surface 111 of the current collector foil 110.

Meanwhile, Examples 2 to 5 are evaluated as a "o." That is, in each of Examples 2 to 5, end portions 124 of an active material layer 121 were able to be successfully removed by the removal portion 40. Each of the electrode plates 100 manufactured in Examples 2 to 5 had non-formation region N1, N2 where a first surface 111 of a current collector foil 110 was exposed successfully. Thus, according to the experiment, it is found that the circumferential speed ratio B and the circumferential speed ratio C are preferably within a range of not less than 4/3 but not more than 2.

TABLE 1

|  | Example 1 | Example 2 | Example 3 | Example 4 | Example 5 | Example 6 |
|---|---|---|---|---|---|---|
| First Roll [m/min] | 15 | 18 | 21 | 24 | 27 | 30 |
| Second Roll [m/min] | 25 | 30 | 35 | 40 | 45 | 50 |
| Third Roll [m/min] |  |  | 60 |  |  |  |
| Removal Roll [m/min] |  |  | 60 |  |  |  |
| Circumferential Speed Ratio A |  |  | 5/3 |  |  |  |
| Circumferential Speed Ratio B | 12/5 | 2 | 12/7 | 3/2 | 4/3 | 6/5 |
| Circumferential Speed Ratio C | 12/5 | 2 | 12/7 | 3/2 | 4/3 | 6/5 |
| Evaluation | Δ | o | o | o | o | Δ |

Further, in the above description, the removal portion 40 is constituted by the removal roll 50 having the large-diameter portions 51 and the small-diameter portion 55 with a radius difference D therebetween, and the removal film 60 in which the first surface 61 and the second surface 62 are both flat. However, other configurations can be used. For example, in the electrode plate manufacturing apparatus 1, a removal portion 140 as one modification illustrated in FIG. 8 can be used instead of the afore-mentioned removal portion 40.

Figure 8:
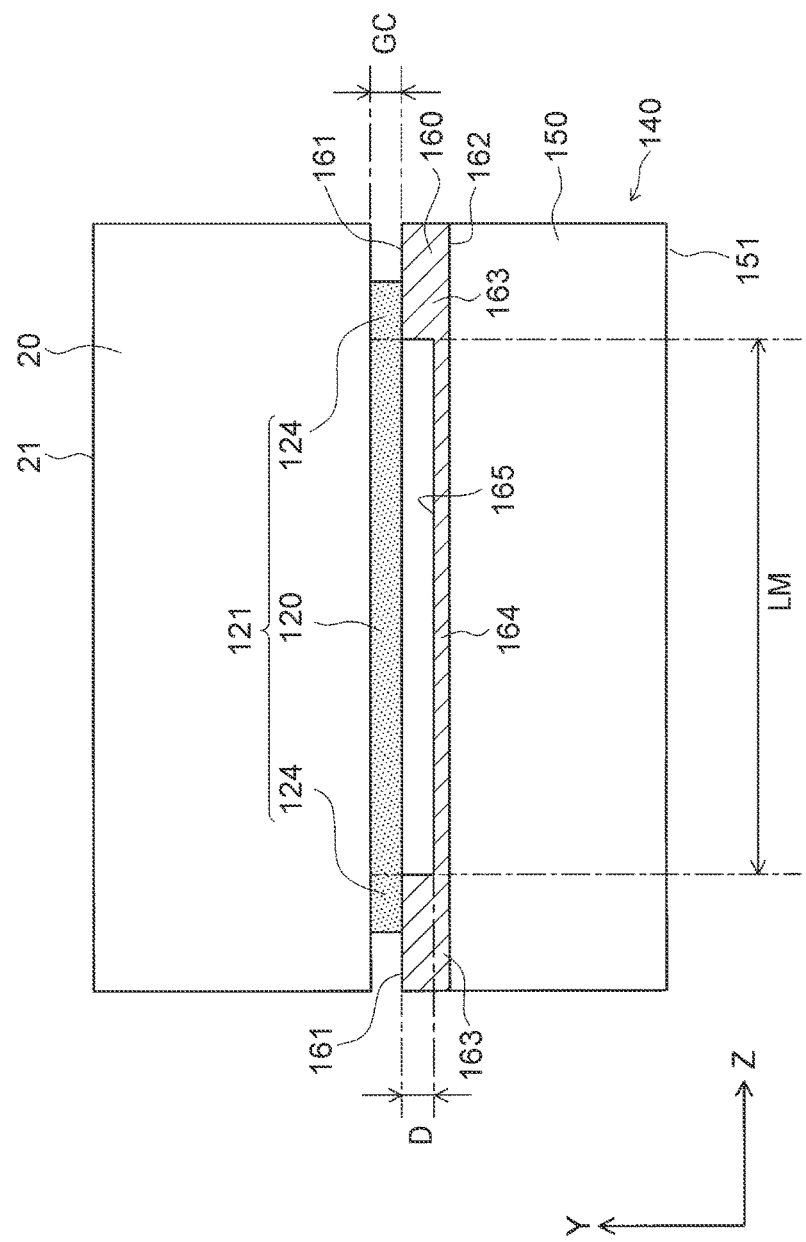
FIG. 8 is a sectional view of a removal portion in a modification at a removal position.

FIG. 8 is a sectional view of the removal portion 140 at a removal position C. In FIG. 8, the Z-axis direction is the right-left direction and the Y-axis direction is the up-down direction. The removal portion 140 is constituted by a removal roll 150 and a removal film 160. The removal roll 150 is placed in parallel to the second roll 20 such that an outer peripheral surface 151 is opposed to the outer peripheral surface 21 of the second roll 20 at the removal position C. Note that the removal roll 150 of the removal portion 140 is configured such that its diameter along the axial direction is uniform, which is different from the removal roll 50 of the removal portion 40.

Further, the removal film 160 of the removal portion 140 is an elongated belt-shaped member, and is wound around the removal roll 150 at the removal position C. On this account, when the removal film 160 is also conveyed by a rotation of the removal roll 150, the removal film 160 passes the removal position C in a state where a first surface 161 faces the second-roll-20 side and a second surface 162 faces the removal-roll-150 side.

Note that a recessed portion 165 is formed in a center, in the width direction, of the removal film 160 of the removal portion 140, which is different from the removal film 60 of the removal portion 40. That is, the removal film 160 illustrated in FIG. 8 includes end portions 163 placed at both axial ends in the width direction, and a central portion 164 placed in a center, in the width direction, sandwiched between the end portions 163 at both ends and having a thickness thinner than the end portions 163. Accordingly, the end portions 163 are parts projecting toward the second roll 20 relative to the central portion 164. That is, in the removal portion 140 of FIG. 8, the end portion 163 can be regarded as a "projecting portion". FIG. 8 shows a difference D in thickness between the end portion 163 and the central portion 164 in the removal film 160.

Further, an interval with a length LM is provided between the end portions 163 placed at both ends of the removal film 160. Hereby, the end portions 163 of the removal film 160 are provided in regions corresponding to the non-formation regions N1, N2 of the electrode plate 100. Further, the central portion 164 of the removal film 160 is provided in a region corresponding to the formation region M of the electrode plate 100.

Consequently, with the use of the removal portion 140 illustrated in FIG. 8, only the end portions 124 of the active material layer 121 on the outer peripheral surface 21 of the second roll 20 are pressurized at the removal position C. The end portions 124 are placed at both ends, in the width direction, of the active material layer 121 so as to be opposed to the end portions 163 of the removal film 160. Accordingly, at the removal position C, the end portions 124 of the active material layer 121 can be transferred to the first surface 161 of the removal film 160 from the outer peripheral surface 21 of the second roll 20 so as to remove the end portions 124 from the outer peripheral surface 21 of the second roll 20. Accordingly, even in a case where the removal portion 140 illustrated in FIG. 8 is used, it is possible to manufacture the electrode plate 100 having the formation region M and the non-formation regions N1, N2 provided appropriately.

Note that, in a case where the removal portion 140 illustrated in FIG. 8 is used, the removal film 160 to be conveyed may meander in the width direction at the removal position C. This is because the strength of the removal film 160 is not so high. In a case where the removal film 160 meanders, a boundary between the formation region M and each of the non-formation regions N1, N2 may not be formed in parallel to the conveying direction of the current collector foil 110. This is because, along with meandering of the removal film 160, a position of the active material layer 121 to be pressurized on the second roll 20 is displaced in the width direction.

In the meantime, in a case of the afore-mentioned removal portion 40, even if the removal film 60 meanders, the large-diameter portions 51 of the removal roll 50 can always pressurize regions corresponding to the non-formation regions N1, N2 appropriately. This is because the removal roll 50 has a strength higher than that of the removal film 60. This accordingly allows the removal portion 40 to stably manufacture the electrode plate 100 with a high quality, as compare with the removal portion 140 of the modification.

Figure 9:
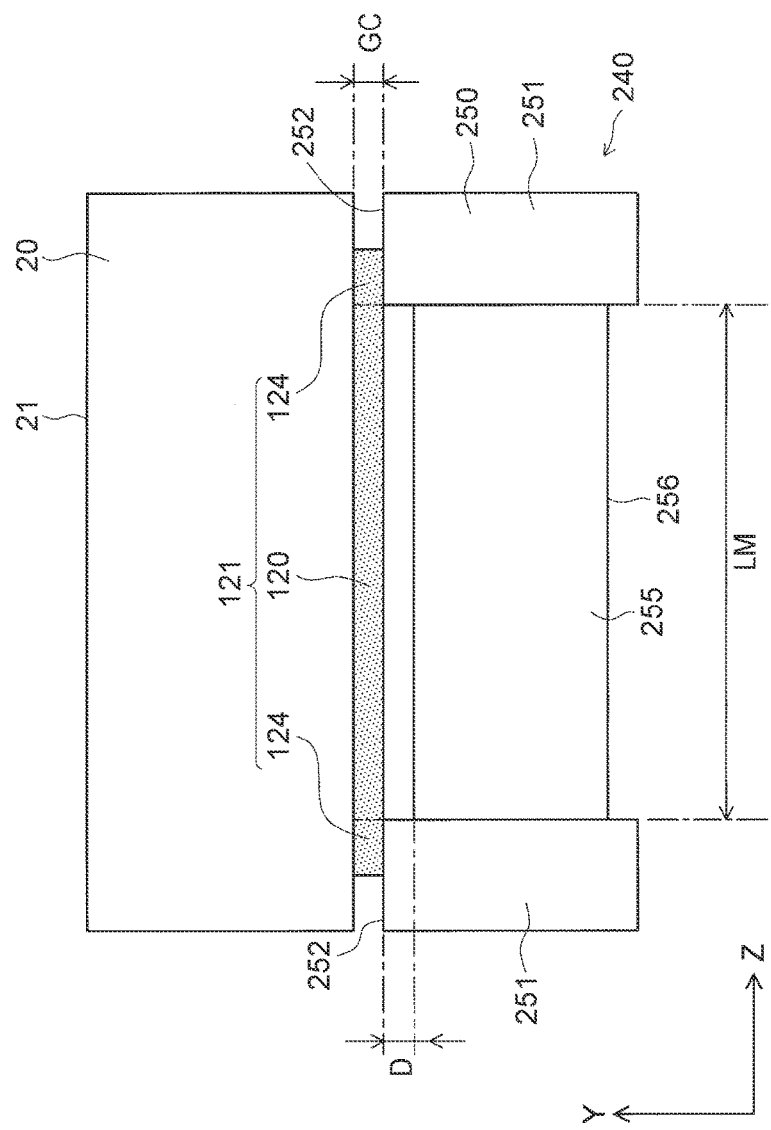
FIG. 9 is a sectional view of a removal portion in a modification different from FIG. 8, at a removal position.

Also, a removal portion 240 illustrated in FIG. 9 may be used instead of the removal portion 40 in the electrode plate manufacturing apparatus 1. FIG. 9 is a sectional view of the removal portion 240 in a modification different from FIG. 8, at the removal position C. In FIG. 9, the Z-axis direction is the right-left direction and the Y-axis direction is the up-down direction. The removal portion 240 includes a removal roll 250 as illustrated in FIG. 9. However, the removal portion 240 does not include the removal film 60 of the removal portion 40.

The removal roll 250 includes large-diameter portions 251 placed at both axial ends, and a small-diameter portion 255 placed in a center in the axial direction so as to be sandwiched between the large-diameter portions 251 at both ends. In view of this, the large-diameter portions 251 are parts projecting toward the second roll 20 relative to the small-diameter portion 255. That is, in the removal portion 240 of FIG. 9, the large-diameter portion 251 can be regarded as a "projecting portion". In FIG. 9, a difference D between a radius of the large-diameter portion 251 and a radius of the small-diameter portion 255 is shown. Further, an interval with a length LM is also provided between the large-diameter portions 251 at both ends of the removal roll 250. Hereby, the large-diameter portions 251 are provided in regions corresponding to the non-formation regions N1, N2 of the electrode plate 100. Further, the small-diameter portion 255 is provided in a region corresponding to the formation region M of the electrode plate 100.

Further, the removal roll 250 is also configured such that outer peripheral surfaces 252 of the large-diameter portions 251 are opposed to the outer peripheral surface 21 of the second roll 20 at the removal position C. Further, the removal roll 250 is also placed in parallel to the second roll 20.

Accordingly, in a case of the removal portion 240 illustrated in FIG. 9, only the end portions 124 of the active material layer 121 on the outer peripheral surface 21 of the second roll 20 are pressurized at the removal position C. The end portions 124 are placed at both ends, in the width direction, of the active material layer 121 so as to be opposed to the large-diameter portions 251 of the removal roll 250. This is because an outer peripheral surface 256 of the small-diameter portion 255 of the removal roll 250 does not make contact with the active material layer 121. Further, in FIG. 9, the end portions 124 of the active material layer 121 can be transferred onto the outer peripheral surfaces 252 of the large-diameter portions 251 of the removal roll 250 from the outer peripheral surface 21 of the second roll 20 at the removal position C, so as to remove the end portions 124 from the outer peripheral surface 21 of the second roll 20. Accordingly, even in a case where the removal portion 240 illustrated in FIG. 9 is used, it is possible to manufacture the electrode plate 100 having the formation region M and the non-formation regions N1, N2 provided appropriately.

Figure 10:
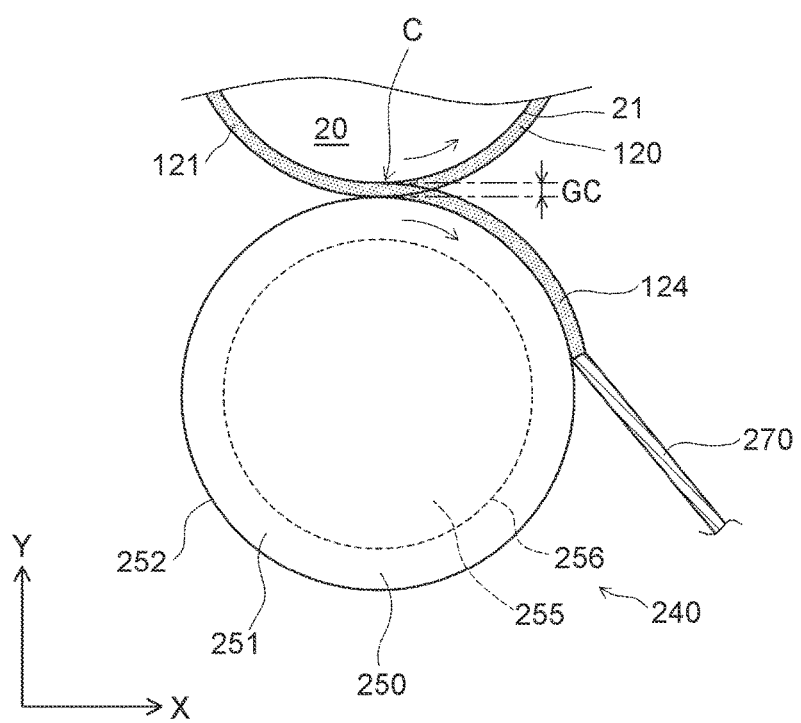
FIG. 10 is a front view of the removal portion of the modification illustrated in FIG. 9.

The end portions 124 of the active material layer 121, transferred onto the outer peripheral surfaces 252 of the large-diameter portions 251 of the removal roll 250 at the removal position C, are removed from the removal roll 250 before they reach the removal position C again by a rotation of the removal roll 250. On this account, as illustrated in a front view of FIG. 10, a blade 270 may be provided to make contact with the outer peripheral surfaces 252 of the large-diameter portions 251 of the removal roll 250. The blade 270 removes the transferred end portions 124 of the active material layer 121 by scraping. Further, when the end portions 124 of the active material layer 121 are removed by the blade 270 from the removal roll 250, the end portions 124 are recovered and subjected to processes such as crushing, so as to be used as the powder constituent 130 again.

Further, in the electrode plate manufacturing apparatus 1 of the present embodiment, the difference D in radius between the large-diameter portion 51 and the small-diameter portion 55 of the removal roll 50 is preferably 10 μm or more. The reason is as follows. That is, when the difference D is too small, the active material layer 120 attached to a region corresponding to the formation region M on the second roll 20 may be pressurized at the removal position C. As a result, a pressurized part of the active material layer 120 might be transferred onto the first surface 61 of the removal film 60. That is, when the difference D in radius between the large-diameter portion 51 and the small-diameter portion 55 of the removal roll 50 is 10 μm or more, the active material layer 120 attached to the region corresponding to the formation region M on the second roll 20 can be left on the second roll 20 appropriately even after the active material layer 120 has passed the removal position C. The same can apply to the difference D in the modifications in FIGS. 8 and 9.

As specifically described above, in the electrode plate manufacturing apparatus 1 of the present embodiment, the end portions 124, corresponding to the non-formation regions N1, N2, in the active material layer 121 formed on the outer peripheral surface of the second roll 20 are removed from the second roll 20 by the removal portion 40 at the removal position C. That is, it is possible to remove the end portions of the active material layer 121 and its vicinal area where the quality easily becomes nonuniform. Accordingly, the active material layer 120 transferred to the first surface 111 of the current collector foil 110 at the second opposed position B has a uniform quality both in terms of the width direction and the conveying direction. Consequently, the electrode plate 100 manufactured by transferring the active material layer 120 to the current collector foil 110 at the second opposed position B has a high quality. Hereby, it is possible to achieve an electrode plate manufacturing method that can manufacture a high-quality electrode plate having a formation region and a non-formation region in a width direction.

Note that the present embodiment is merely an example, and is not intended to limit the present invention at all. Accordingly, it goes without saying that the present invention can be altered or modified variously within a range which does not deviate from the gist of the present invention. For example, the above embodiment deals with a case where the active material layer 120 is formed only on the first surface 111 of the current collector foil 110, but the active material layer 120 can be formed on the second surface 112 of the current collector foil 110. For example, the active material layer 120 can be formed on the second surface 112 of the current collector foil 110 in the same manner as a case where the active material layer is formed on the first surface 111 as described above.

Further, the division plates 71 may not be provided. However, in a case where the division plates 71 are not provided, the powder constituent 130 accumulated between the first roll 10 and the second roll 20 above the first opposed position A easily protrudes outward relative to the region corresponding to the formation region M. Because of this, in a case where the division plates 71 are not provided, an amount of the end portions 124 of the active material layer 121 to be removed by the removal portion 40 from the second roll 20 at the removal position C increases. In view of this, by providing the division plates 71, it is possible to increase a yield.

Further, for example, the above embodiment deals with the electrode plate 100 in which the formation region M is provided in the center in the width direction and the non-formation regions N1, N2 are provided at both ends. However, the arrangement of the formation region and the non-formation regions is not limited to that of the electrode plate 100. For example, the present invention can be applied to manufacture of an electrode plate in which a non-formation region is provided in a center in a width direction and formation regions are provided at both ends. Alternatively, the present invention can be also applied to manufacture of an electrode plate in which a formation region is provided in one end in a width direction and a non-formation region is provided in the other end.

Further, for example, the above embodiment deals with a case where the powder constituent 130 made of granulated particles of the active material 131 and the binding material 132 is used as an active material layer material to be supplied to the first opposed position A. However, the granulated particles may not necessarily be used as the active material layer material. That is, as the active material layer material, it is possible to use a powder constituent obtained by mixing powders of materials necessary to form the active material layer 120. Alternatively, the active material layer material is not limited to a powdered material, but a material containing a solvent together with the active material 131, the binding material 132, and so on is also usable.

What is claimed is:

1. A method for manufacturing an electrode plate having a formation region and a non-formation region on a surface of a current collector foil, the formation region being a region in which an active material layer containing at least an active material and a binding material is formed, the non-formation region being a region in which the current collector foil is exposed, the electrode plate being manufactured such that, while the current collector foil having a belt shape is conveyed, the active material layer is formed in a part, in a width direction, of the conveyed current collector foil, the method using an electrode plate manufacturing apparatus including:
a first roll and a second roll placed in parallel to each other and configured to rotate in directions where moving directions of outer peripheral surfaces of the first roll and the second roll at a first position where the outer peripheral surfaces are opposed to each other are both downward along a vertical direction;
a third roll placed in parallel to the second roll so as to be opposed to the second roll at a second position different from the first position, the third roll being configured to rotate in a direction where a moving direction of an outer peripheral surface of the third roll at the second position is the same as the moving direction of the outer peripheral surface of the second roll;

a removal portion provided at a third position on a downstream side relative to the first position but on an upstream side relative to the second position in a rotation direction of the second roll, the removal portion being configured such that a removal surface opposed to the second roll is moved in the same direction as the moving direction of the outer peripheral surface of the second roll at the third position; and a supply portion configured to supply an active material layer material toward the first position from above the first position, the active material layer material containing at least the active material and the binding material, the second roll being configured to rotate at a circumferential speed faster than a circumferential speed of the first roll, the third roll being configured to rotate at a circumferential speed faster than the circumferential speed of the second roll, the removal portion being configured to move the removal surface at a moving speed faster than a moving speed of the outer peripheral surface of the second roll at the third position, wherein the removal portion includes:

a removal roll placed in parallel to the second roll such that an outer peripheral surface of the removal roll is opposed to the second roll at the third position, the removal roll being configured to rotate in a direction where a moving direction of the outer peripheral surface of the removal roll at the third position is the same as the moving direction of the outer peripheral surface of the second roll, and a removal film wound around the removal roll and configured to pass the third position by a rotation of the removal roll, the removal film having the removal surface on a surface on a second-roll side; and a projecting portion that projects toward the second roll in a region corresponding to the non-formation region, the projecting portion provided at opposing ends of the removal roll so that an outer circumference of the removal roll at the opposing ends has a larger diameter than the outer circumference of the removal roll between the opposing ends, the method comprising:

pressurizing the active material layer material supplied from the supply portion by the first roll and the second roll both rotating while the active material layer material passes the first position, thereby forming the active material layer such that the active material layer material thus pressurized is attached onto the second roll;

pressurizing, in a thickness direction, only a part corresponding to the non-formation region in the active material layer by the outer circumference of the opposing ends of the removal roll that form the projecting portion at a time when the active material layer passes the third position between the removal surface of the removal film and the second roll, thereby transferring the pressurized part of the active material layer from the second roll to the removal surface of the removal film so as to remove the pressurized part of the active material layer; and conveying the current collector foil by the rotating third roll so as to pass the second position, thereby pressurizing, in the thickness direction, the current collector foil and the active material layer passing the second position between the second roll and the third roll and transferring the active material layer onto the surface of the current collector foil from the second roll.

2. The method for manufacturing the electrode plate according to claim 1, wherein, during the conveying, a ratio of the circumferential speed of the third roll with respect to the circumferential speed of the second roll is a circumferential speed ratio B, and a ratio of the circumferential speed of the removal roll with respect to the circumferential speed of the second roll is a circumferential speed ratio C, and a ratio of B:C is 4/3 or more and 2 or less.

3. An apparatus for manufacturing an electrode plate having a formation region and a non-formation region on a surface of a current collector foil, the formation region being a region in which an active material layer containing at least an active material and a binding material is formed, the non-formation region being a region in which the current collector foil is exposed, the apparatus comprising:

a first roll and a second roll placed in parallel to each other and configured to rotate in directions where moving directions of outer peripheral surfaces of the first roll and the second roll at a first position where the outer peripheral surfaces are opposed to each other are both downward along a vertical direction;

a third roll placed in parallel to the second roll so as to be opposed to the second roll at a second position different from the first position, the third roll being configured to rotate in a direction where a moving direction of an outer peripheral surface of the third roll at the second position is the same as the moving direction of the outer peripheral surface of the second roll;

a removal portion provided at a third position on a downstream side relative to the first position but on an upstream side relative to the second position in a rotation direction of the second roll, the removal portion being configured such that a removal surface opposed to the second roll is moved in the same direction as the moving direction of the outer peripheral surface of the second roll at the third position;

a supply portion configured to supply an active material layer material toward the first position from above the first position, the active material layer material containing at least the active material and the binding material; and a control unit configured to rotate the second roll at a circumferential speed faster than a circumferential speed of the first roll, to rotate the third roll at a circumferential speed faster than the circumferential speed of the second roll, and to cause the removal portion to move the removal surface at a moving speed faster than a moving speed of the outer peripheral surface of the second roll at the third position, wherein the removal portion includes a removal roll placed in parallel to the second roll such that an outer peripheral surface of the removal roll is opposed to the second roll at the third position, the removal roll being configured to rotate in a direction where a moving direction of the outer peripheral surface of the removal roll at the third position is the same as the moving direction of the outer peripheral surface of the second roll, and a removal film wound around the removal roll and configured to pass the third position by a rotation of the removal roll, the removal film having the removal surface on a surface on a second-roll side; and a projecting portion that projects toward the second roll in a region corresponding to the non-formation region, the projecting portion provided at opposing ends of the removal roll so that an outer circumference of the removal roll at the opposing ends has a larger diameter than the outer circumference of the removal roll between the opposing ends, so that only a part corresponding to the non-formation region in the active material layer is pressurized by the outer circumference of the opposing ends of the removal roll that form the projecting portion so as to remove the pressurized part of the active material layer.

4. The apparatus for manufacturing the electrode plate according to claim 3, wherein the control unit is further configured to control a ratio of the circumferential speed of the third roll with respect to the circumferential speed of the second roll to be a circumferential speed ratio B, and a ratio of the circumferential speed of the removal roll with respect to the circumferential speed of the second roll to be a circumferential speed ratio C, and a ratio of B:C is 4/3 or more and 2 or less.

* * * * *